United States Patent
Amelio

[11] Patent Number: 5,699,965
[45] Date of Patent: Dec. 23, 1997

[54] INFRARED SUPPRESSOR FOR A GAS TURBINE ENGINE

[75] Inventor: Armand F. Amelio, Yonkers, N.Y.

[73] Assignee: Sikorsky Aircraft Corporation, Stratford, Conn.

[21] Appl. No.: 374,025

[22] Filed: Jun. 30, 1989

[51] Int. Cl.⁶ .................................................. F02K 1/46
[52] U.S. Cl. .................... 239/127.3; 239/265.17; 60/39.5; 60/319
[58] Field of Search .............. 60/39.5, 319, 320; 239/127.3, 265.17, 265.19, 265.35

[56] References Cited

U.S. PATENT DOCUMENTS

| | | | |
|---|---|---|---|
| 2,690,886 | 10/1954 | Laskowitz | 239/265.35 |
| 3,212,700 | 10/1965 | Guienne et al. | 230/103 |
| 3,628,885 | 12/1971 | Sidenstick et al. | 416/97 |
| 3,685,612 | 8/1972 | Bertin | 239/265.17 |
| 3,921,906 | 11/1975 | Nye et al. | 239/127.3 |
| 3,926,373 | 12/1975 | Viets | 239/265.17 |
| 3,981,448 | 9/1976 | Demogenes et al. | 239/127.3 |
| 4,198,817 | 4/1980 | Funita et al. | 60/319 |
| 4,312,480 | 1/1982 | Miller | 239/127.3 |

FOREIGN PATENT DOCUMENTS

| | | |
|---|---|---|
| 36643 | 9/1981 | European Pat. Off. . |
| 2338380 | 8/1977 | France . |
| 1070448 | 12/1959 | Germany ............ 239/265.17 |
| 312023 | 5/1929 | United Kingdom . |

*Primary Examiner*—Michael J. Carone

[57] ABSTRACT

An IR suppressor produces a thin "ribbon" exhaust plume using a tapered exhaust manifold which has a plurality of discrete exhaust nozzles that are longitudinally aligned with the exhaust manifold. Optionally, the nozzles extend within but are spaced apart from mixing ducts which are open to the ambient air at both ends. The mixing ducts mix ambient air with the exhaust plume. In another aspect of this invention, a single nozzle (which is longitudinally aligned with the manifold) is substituted for the plurality of discrete exhaust nozzles. In this aspect, the nozzle extends within but is spaced apart from a mixing duct which is open at both ends and has a curve sufficient to block a line of sight to the nozzle. A helicopter that has a rotatable IR suppressor so that the exhaust can be directed substantially parallel to the helicopter blades when the blades are not turning to protect them from exhaust heat is also disclosed.

6 Claims, 2 Drawing Sheets

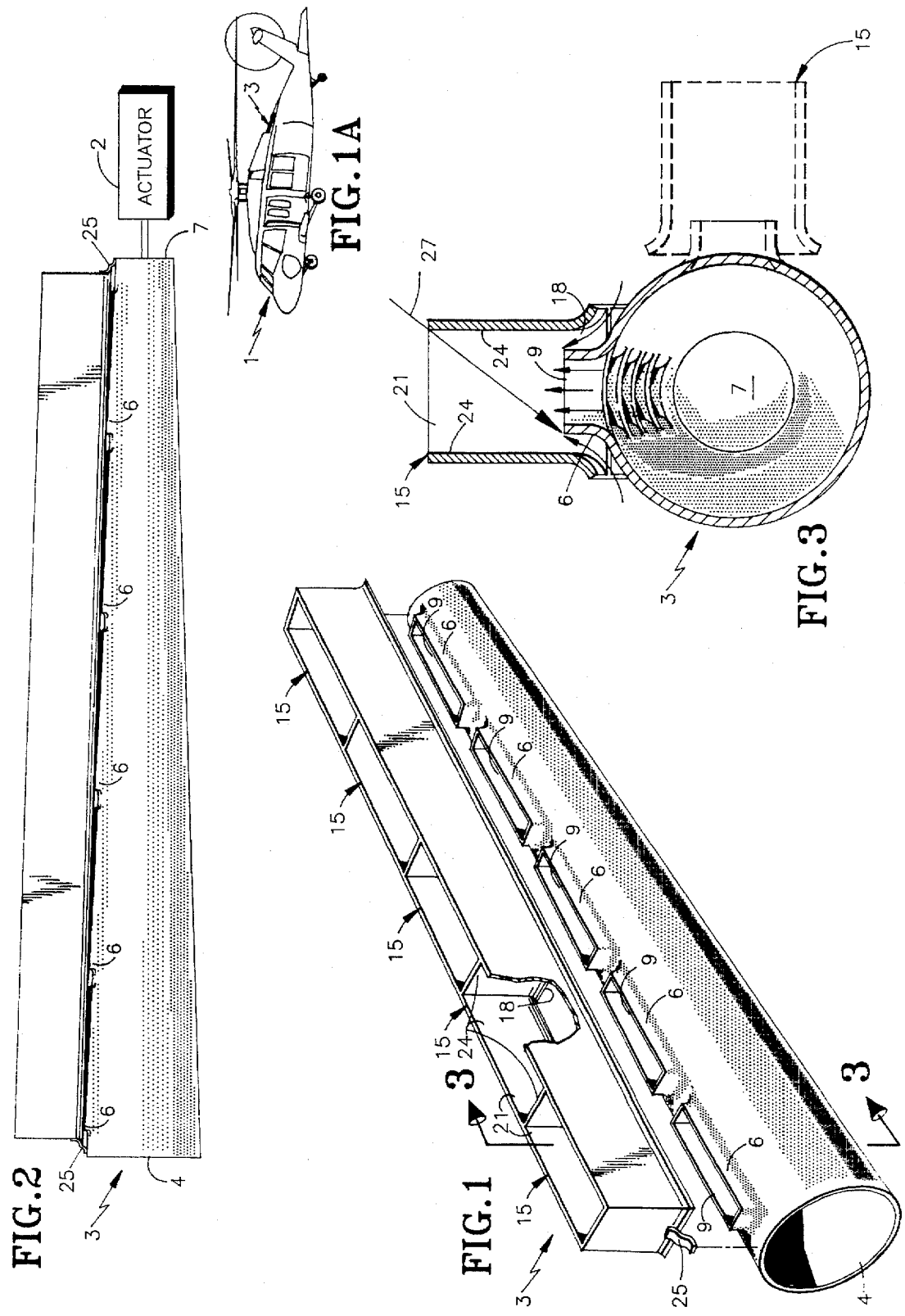

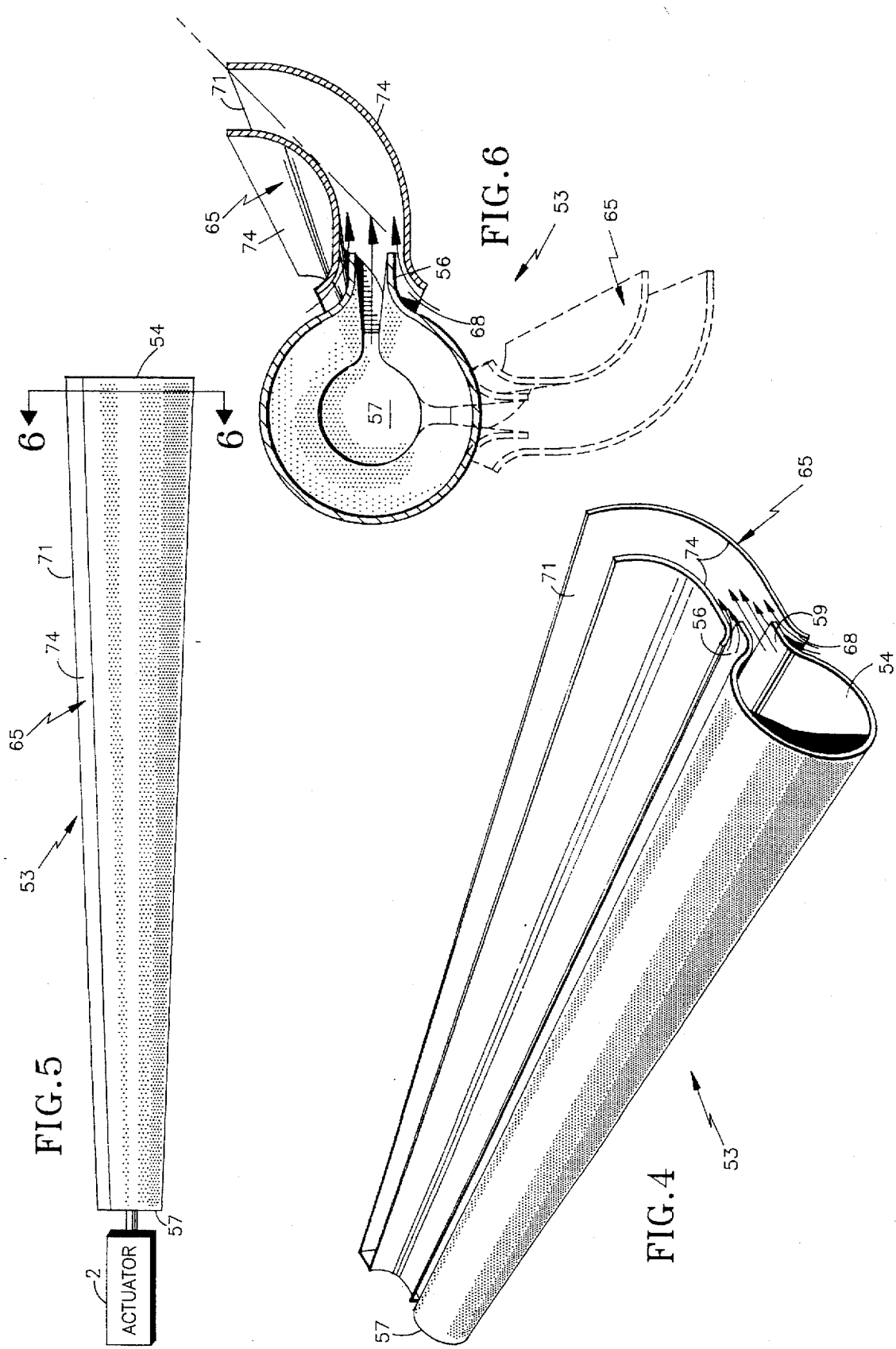

INFRARED SUPPRESSOR FOR A GAS TURBINE ENGINE

TECHNICAL FIELD

The field of art to which this invention pertains is suppressor systems for gas turbine engines.

BACKGROUND ART

The advent of infrared radiation (IR) homing weapons has greatly increased the vulnerability of aircraft such as airplanes, missiles, and helicopters to air and ground launched missile attack. These aircraft discharge hot engine exhaust which has a strong infrared radiation signal. In addition, the propulsion means for the aircraft invariably include hot metal parts that radiate a strong infrared radiation signal. The hot metal parts are normally associated with either the gas turbine or jet engine exhaust system. In order to decrease this vulnerability of aircraft, it is necessary to reduce or suppress this infrared radiation signal or signature. Typically, a reduction in IR signal has been approached in two manners. A first approach has been the mixing of cooling air with the engine exhaust to lower its temperature and IR signal. A second mechanism has been to block a direct line of sight into the core engine. While certain advancements have been made in this direction, considerably further effort is still required to produce satisfactory IR suppression results.

DISCLOSURE OF INVENTION

This invention is directed to an infrared suppressor for a gas turbine engine that, through an efficient configuration, mixes ambient air with the exhaust to lower the IR exhaust signal, reduces the IR signal of hot exhaust parts and eliminates a line of sight into the exhaust nozzle.

The present invention produces a thin "ribbon" exhaust plume using a tapered exhaust manifold which has a plurality of discrete exhaust nozzles that are longitudinally aligned with the exhaust manifold. Optionally, the nozzles extend within but are spaced apart from mixing ducts which are open to the ambient air at both ends. The mixing ducts mix ambient air with the exhaust plume.

In another aspect of this invention, a single nozzle (which is longitudinally aligned with the manifold) is substituted for the plurality of discrete exhaust nozzles. In this aspect, the nozzle extends within but is spaced apart from a mixing duct which is open at both ends and has a curve sufficient to block a line of sight to the nozzle.

Yet another aspect of this invention is a helicopter that has a rotatable IR suppressor so that the exhaust can be directed substantially parallel to the helicopter blades when the blades are not turning to protect them from exhaust heat.

Other features and advantages will be apparent from the specification and claims and from the accompanying drawings which illustrate an embodiment of the invention.

BRIEF DESCRIPTION OF DRAWINGS

FIG. 1 illustrates an exploded perspective view, partly broken away, of an infrared suppressor of this invention.

FIG. 1A is a perspective view of a helicopter having a gas turbine engine embodying the present invention.

FIG. 2 illustrates a side view of the infrared suppressor of FIG. 1.

FIG. 3 illustrates a cross-section taken along line 3—3 of the infrared suppressor of FIG. 1.

FIG. 4 is a perspective view partly broken away of a second infrared suppressor of this invention.

FIG. 5 illustrates a side view of the infrared suppressor of FIG. 4.

FIG. 6 illustrates a cross-section taken along line 6—6 of the infrared suppressor of FIG. 5.

BEST MODE FOR CARRYING OUT THE INVENTION

In FIG. 1, the exhaust manifold 3 has an inlet 4 for receiving exhaust gases from an engine. The exhaust manifold 3 is tapered to have a progressively decreasing cross-sectional area from the inlet 4 (upstream) to the closed end 7 (downstream) of the manifold. The exhaust manifold 3 may have a variety of cross-section shapes such as round, oval, square etc. The exhaust manifold 3 has a plurality of nozzles 6 extending from the manifold that are disposed along a substantial length of the exhaust manifold 3. The nozzles 6 may be integrally formed in the exhaust manifold 3 or they may be fastened on by conventional means such as fasteners. Nozzle openings 9 and the exhaust manifold 3 are longitudinally aligned. The nozzles 6 extend substantially normal from the exhaust manifold 3 as this reduces the nozzles 6 acting like a turning vane (e.g., the nozzles 6 increasing back pressure). Thus, each nozzle 6 has a substantially unobstructed exhaust flowpath to the ambient air. Preferably, the nozzle openings 9 have a length to width ratio that is above about 6 to 1 as this provides a long thin plume resembling a gaseous "ribbon". Since the ribbon is thin in cross-section, it is less visible to IR detectors. Furthermore, the ribbon exhaust is more readily dissipated into the surrounding atmosphere further reducing the IR signature.

The exhaust manifold cross-section area at any preselected point along the manifold 3 has a total area that substantially equals the total area of the nozzles 6 downstream of the preselected point. In conjunction with this equivalence of manifold inlet area and nozzle area, the taper of the exhaust manifold 3 is such that there is a substantially constant exhaust velocity flow and substantially constant exhaust velocity pressure along the length of the exhaust manifold 3. This results in a substantially constant exhaust gas turning angle along the length of the exhaust manifold 3 through the nozzles 6 without the use of turning vanes which may increase back pressure and result in hot metal parts. The particular turning angle achieved is dependent on and varies with the particular exhaust velocity. An exemplary configuration used for helicopter applications results in a constant turning angle of about 45°.

A plurality of mixing ducts 15 for mixing cooling air with the exhaust to lower the intensity of the exhaust IR signal, are disposed along the exhaust manifold 3. The mixing ducts have an upstream orifice 18, a downstream orifice 21, and sidewalls 24. The mixing ducts extend substantially normal to the manifold 3. Thus, the nozzles 6 extend within and are aligned with the mixing ducts 15. These mixing ducts may be attached directly to the exhaust manifold by conventional means such as brackets 25 or may be disposed over the manifold by a suitable airframe attachment. As illustrated in FIG. 3, the mixing ducts 15 are also spaced apart from the exhaust manifold 3. This provides an inlet space between the nozzles 6 and the mixing ducts 15. The mixing ducts 15 also inhibit a direct line of sight 27 to the exhaust nozzles 6. Thus, the depth and spacing of the mixing duct sidewalls 24 are selected to prevent a direct line of sight 27 to the hot exhaust nozzle 6 from preselected angles. Thus, the exhaust nozzle is not visible from limited viewing angles such as those that are substantially perpendicular to the mixing duct sidewalls 24.

As the exhaust is discharged from the nozzles 6 through the mixing ducts 15 a venturi effect is created drawing ambient air under atmospheric pressure into the upstream orifice 18 of mixing ducts 15 through the inlet space surrounding the nozzles 6. The air mixes with the exhaust gas in the mixing ducts 15 and is discharged at a cooler temperature from the downstream orifice 21 of mixing ducts 15 thus lowering the intensity of the IR signal. In addition, the cooling air lowers the temperature of the mixing ducts sidewalls 24 since a blanket of cooling air is disposed between the sidewalls 24 and the hot exhaust gases. Thus, the IR signal of hot metal parts is also reduced.

In FIG. 4, the plurality of longitudinally aligned discrete nozzles have been substituted by a single continuous nozzle. A single curved mixing duct has been substituted for the plurality of straight mixing ducts. The exhaust manifold 53 has an inlet 54 for receiving exhaust gases from an engine. As illustrated in FIGS. 4 and 5, the exhaust manifold 53 is tapered to have a progressively decreasing cross-sectional area from the inlet 54 (upstream) to the closed end 57 (downstream) of the manifold. The exhaust manifold 53 has a nozzle 56 extending from the manifold that is disposed along a substantial length of the exhaust manifold 53. Nozzle opening 59 and the exhaust manifold 53 are longitudinally aligned. As with the previous configuration, the nozzle 56 has a substantially unobstructed exhaust flowpath to the ambient air. Preferably, the nozzle 56 has a length to width ratio that provides the highest practical ratio preferably above about 60 to 1 as this provides a long, thin plume resembling a gaseous "ribbon".

A mixing duct 65 is disposed external to the exhaust manifold 53. The mixing duct 65 mixes cooling gases with the exhaust to lower the IR signal of the exhaust. In FIG. 4, the mixing duct 65 comprises a mixing duct 65 disposed along the exhaust manifold 53. The mixing duct 65 extends substantially normal to the exhaust manifold 53 and then curves transverse to the exhaust manifold. The mixing duct 65 has an upstream orifice 68, a downstream orifice 71 and sidewalls 74. The mixing duct upstream orifice 68 is in fluid communication with the nozzle opening 59. The nozzle 56 extends within and is aligned with the mixing duct 65. The mixing duct 65 is also spaced apart from the exhaust manifold 53. This provides an inlet space between the nozzle 56 and the mixing duct 65.

As with the previous configuration, this IR suppressor lowers the IR image by mixing the exhaust gas with ambient air and discharging the resultant mixture through the mixing duct. In addition, a cooling blanket of the ambient air coats the mixing duct 65 interior surfaces preventing any significant temperature rise, thus lowering the IR signal. Thus, the IR signature of the exhaust gas and the hot metal parts is reduced. Finally, since the mixing duct 65 curves transverse to the exhaust manifold 53 a line of sight is obstructed into the exhaust nozzle as depicted in FIG. 6.

These IR suppressor systems can be rotatable in contrast to prior art systems in order to change the exhaust plume direction. Cross-section FIGS. 3 and 6 illustrate this feature for the two IR suppressors shown in FIGS. 1 and 3 respectively. As shown in FIG. 2, means for rotating the suppressor such as an actuator 2 is utilized. In helicopter 1 applications similar to the type in FIG. 1A, direction of the exhaust plume towards the helicopter blade results in increased IR suppression through the exhaust mixing with the helicopter down wash. In addition, this eliminates ground and most air based line of sight viewing angles. When the helicopter is on the ground and the blades are not turning, direction of the exhaust plume substantially parallel (shown in phantom, FIGS. 3 and 6) to the blades protects the blades and any surface combustibles.

This invention provides an IR suppressor that reduces the IR signal of the exhaust gas through mixing ambient air with the exhaust in addition to rotor and free air stream interaction. In addition, the suppressor reduces the IR signal of the hot exhaust parts and eliminates a line of sight into the exhaust nozzle without creating significant back pressure. Finally, it increases the pumping action of the exhaust manifold. These suppressors use low weight configurations to achieve the above results. Thus, this invention makes a significant contribution to the field of IR suppression by providing an IR suppressor that significantly reduces the overall IR signal in an efficient manner.

It should be understood that the invention is not limited to the particular embodiments shown and described herein, but that various changes and modifications may be made without departing from the spirit and scope of this novel concept as defined by the following claims.

I claim:

1. In an infrared suppressor for the exhaust of a gas turbine engine, said suppressor comprising an elongated tapered exhaust manifold, said manifold having an inlet for receiving said exhaust and a plurality of spaced apart manifold nozzles in fluid communication with said manifold, said nozzles substantially aligned along the manifold for dispersing said exhaust, the improvement characterized by:

a) each nozzle having an elongated opening, each opening being longitudinally aligned with said manifold and each nozzle having a substantially unobstructed exhaust flowpath to the ambient air;

b) a plurality of mixing ducts, each mixing duct having sidewalls, an upstream orifice and a downstream orifice, said upstream and downstream orifices being open to the ambient air; and c) said manifold nozzles extending within but spaced apart from said mixing ducts.

2. The infrared suppressor as recited in claim 1 wherein said mixing duct blocks a line of sight to each nozzle from angles substantially perpendicular to said mixing duct sidewalls.

3. The infrared suppressor as recited in claim 1 wherein said gas turbine engine provides power to helicopter blades and including means for rotating said infrared suppressor, such that said exhaust flowpath can be directed substantially parallel to the helicopter blades.

4. The infrared suppressor as recited in claim 1 wherein said manifold has a decreasing cross-sectional area and the cross-sectional area of the manifold at any preselected point substantially equals the total area of the nozzles downstream of the preselected point.

5. In an infrared suppressor for the exhaust of a gas turbine engine, said suppressor comprising an elongated tapered exhaust manifold, said manifold having an inlet for receiving said exhaust and a plurality of spaced apart manifold nozzles in fluid communication with said manifold, said nozzles substantially aligned along the manifold for dispersing said exhaust, the improvement characterized by each nozzle having an opening, each opening being elongated and longitudinally aligned with the manifold and each nozzle having a substantially unobstructed exhaust flowpath to the ambient air.

6. In an infrared suppressor for the exhaust of a gas turbine engine, said suppressor comprising an elongated tapered exhaust manifold, said manifold having an inlet for receiving said exhaust and at least one nozzle in fluid communication with said manifold for dispersing said exhaust, the improvement characterized by:

each said nozzle having an elongated opening, said opening being longitudinally aligned with the manifold and said nozzle having a substantially unobstructed flow path to the ambient air;

a respective mixing duct for each said nozzle, each said mixing duct having an upstream orifice and a downstream orifice, said upstream and downstream orifices being open to the ambient air; and each said manifold nozzle extending within but spaced apart from the respective said mixing duct.

\* \* \* \* \*